United States Patent
Mohanty et al.

(10) Patent No.: US 9,210,532 B2
(45) Date of Patent: Dec. 8, 2015

(54) CHANGING THE MACHINE-TO-MACHINE (M2M) GROUP OF AN M2M DEVICE

(75) Inventors: Shantidev Mohanty, Santa Clara, CA (US); Rui Huang, Beijing (CN); Honggang Li, Beijing (CN); Marta M. Tarradell, Hillsboro, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,173

(22) PCT Filed: Dec. 16, 2011

(86) PCT No.: PCT/US2011/065379
§ 371 (c)(1),
(2), (4) Date: Nov. 13, 2013

(87) PCT Pub. No.: WO2013/089766
PCT Pub. Date: Jun. 20, 2013

(65) Prior Publication Data
US 2014/0256324 A1    Sep. 11, 2014

Related U.S. Application Data

(60) Provisional application No. 61/533,689, filed on Sep. 12, 2011.

(51) Int. Cl.
*H04W 36/00* (2009.01)
*H04W 72/00* (2009.01)
(Continued)

(52) U.S. Cl.
CPC ............... *H04W 4/005* (2013.01); *H04W 4/08* (2013.01); *H04W 8/26* (2013.01); *H04W 8/186* (2013.01); *H04W 36/08* (2013.01)

(58) Field of Classification Search
CPC ....... H04W 4/005; H04W 36/08; H04W 4/08; H04W 4/12; H04W 60/00; H04W 60/04; H04W 68/00; H04W 68/02; H04W 88/08; H04W 8/186; H04W 8/26; H04W 92/18; H04W 36/0088; H04W 4/06; H04W 72/005
USPC ......... 370/331, 312, 32; 455/458, 456.1, 509, 455/522, 432.1, 435.1, 436, 550.1, 452.1, 455/418, 434, 438, 445, 450, 466, 515, 558
See application file for complete search history.

(56) References Cited

U.S. PATENT DOCUMENTS

2005/0076143 A1 * 4/2005 Wang et al. .................... 709/245
2006/0009241 A1 * 1/2006 Ryu et al. ...................... 455/458

(Continued)

FOREIGN PATENT DOCUMENTS

WO    2013/089766 A1    6/2013

OTHER PUBLICATIONS

International Search Report and Written opinion for PCT Patent Application No. PCT/US2011/065379, mailed on Aug. 28, 2012, 11 Pages.

(Continued)

*Primary Examiner* — Inder Mehra
(74) *Attorney, Agent, or Firm* — Alpine Technology Law Group LLC

(57) ABSTRACT

Briefly, in accordance with one or more embodiments, communication is made by a machine-to-machine (M2M) device with a first base station using a first group identifier, and then a handover is performed to a second base station. The M2M device listens to a message broadcast by the second base station to determine if the first group identifier should be changed. The M2M device requests assignment of a second group identifier for communication with the second base station if it is determined that the group identifier should be changed for the M2M device. In some embodiments, the M2M device wake from an idle mode to listen to a message broadcast by the base station. If the message indicates that a group identifier should be changed, the M2M device requests assignment of an updated group identifier.

15 Claims, 10 Drawing Sheets

(51) Int. Cl.
*H04B 7/00* (2006.01)
*H04W 4/00* (2009.01)
*H04W 4/08* (2009.01)
*H04W 8/26* (2009.01)
*H04W 36/08* (2009.01)
*H04W 8/18* (2009.01)

(56) References Cited

U.S. PATENT DOCUMENTS

| | | | |
|---|---|---|---|
| 2008/0125164 A1* | 5/2008 | Singh | 455/550.1 |
| 2009/0316654 A1* | 12/2009 | Prakash et al. | 370/331 |
| 2010/0057485 A1* | 3/2010 | Luft | 705/1 |
| 2010/0061289 A1* | 3/2010 | Mun et al. | 370/312 |
| 2010/0081454 A1* | 4/2010 | Wang et al. | 455/456.1 |
| 2013/0040680 A1* | 2/2013 | Kim et al. | 455/509 |
| 2014/0169259 A1* | 6/2014 | Lee et al. | 370/312 |
| 2014/0376442 A1* | 12/2014 | Kim et al. | 370/312 |

OTHER PUBLICATIONS

International Preliminary Report on Patentability and Written Opinion received for PCT Patent Application No. PCT/US2011/065379, mailed on Jun. 26, 2014, 7 pages.

Office Action received for Korean Patent Application No. 2014-7008186, mailed on Feb. 25, 2015, 6 pages including 2 pages of English translation.

Notice of Allowance received for Korean Patent Application No. 10-2014-7008186, mailed on Jul. 10, 2015, 3 pages including 1 page of English Translation.

* cited by examiner

CHANGING THE MACHINE-TO-MACHINE (M2M) GROUP OF AN M2M DEVICE

CROSS-REFERENCE TO RELAYED APPLICATIONS

The present application claims the benefit of U.S. Application No. 61/533,689 filed Sep. 12, 2011. Said Application No. 61/533,689 is hereby incorporated herein by reference in its entirety.

BACKGROUND

Machine-to-machine (M2M) communication systems may involve an arrangement of devices in a network to periodically transmit and/or receive relatively small amounts of data to a remote application/server. Machine-to-machine systems are sometimes referred to as an "Internet of things" to exchange information between a subscriber station and a server in a core network via a wireless link with a base station or a wired link, or alternatively between other subscriber stations, wherein the exchange of information may be carried out without requiring or involving human interaction. For example, field data may be gathered by the M2M devices and sent back to a monitoring station for collection and analysis. In such an example, the M2M devices may comprise parking meters. When the parking meter is full of coins and is ready to be emptied, a given parking meter may communicate its state to a monitoring server coupled to the network, in which case an operator may then go that parking meter and remove the coins stored therein. In yet another example, M2M devices may be deployed to monitor for the presence of a specified hazardous substance such as a chemical agent, a biological agent, and/or a radionuclide wherein the M2M device includes an appropriate sensor.

Multiple machine-to-machine (M2M) devices are typically grouped together and assigned a common identifier for the group. The common identifier allows the data transmissions to or from the group of M2M devices to be handled collectively rather than by a given device individually. However, from time to time one or more of the devices may be relocated from one group to another group, in which case moved device(s) should be assigned to a new group identifier.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
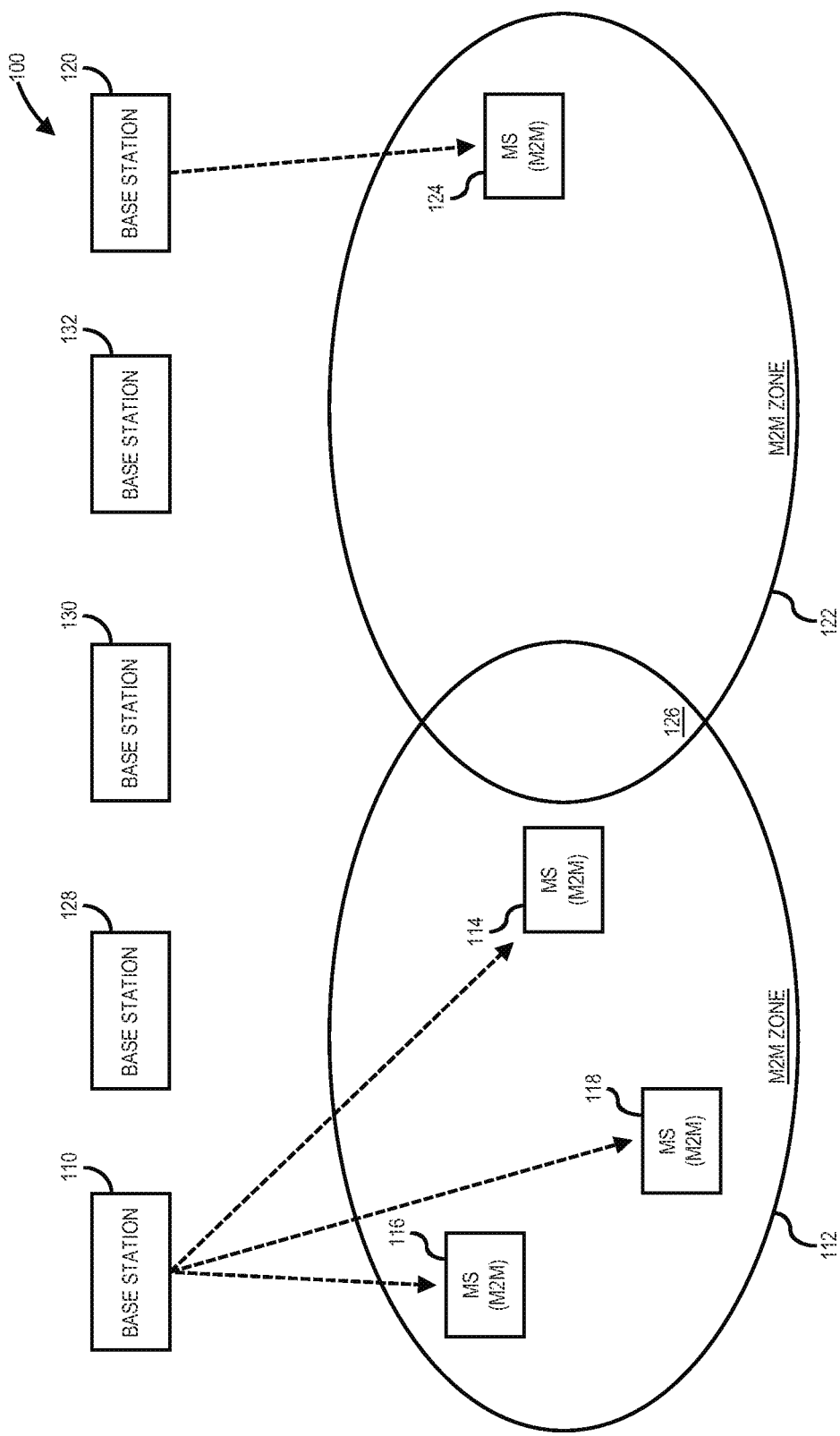
FIG. 1 is a diagram of a machine-to-machine (M2M) system in which an M2M mobile station belongs to a first M2M group in a first M2M zone in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a machine-to-machine (M2M) system in which an M2M mobile station belongs to a first M2M group in a first M2M zone in accordance with one or more embodiments will be discussed. As shown in FIG. 1, a machine-to-machine (M2M) system 100 may comprise a base station 110 serving one or more M2M devices or mobile stations (MS) that belongs to a first M2M group within a first M2M zone 112. For example, M2M mobile station 114, M2M mobile station 116, and M2M mobile station 118 may belong to a group that has been assigned to the same M2M Group Identifier (MGID) which may comprise, for example, a 15-bit value that uniquely identifies an M2M group in the domain of the network entity that assigns the MGID to which one or more M2M devices belong. The domain of the network entity may be identified by an M2M zone identifier (M2M_ZONE_ID) which may be broadcast by an AAI_SCD message. An M2M group may be defined as a set of M2M devices having a common identifier such as a common MGID. An M2M zone may be defined as a geographic area, served by one or more base stations, in which an M2M group and the M2M Group Identifier is valid. Similarly, base station 120 may serve one or more devices or mobile stations that belong to a second M2M group within a second M2M zone 122 wherein M2M mobile station 124 may belong to the second M2M group that has been assigned another MGID. In one or more embodiments, the M2M system 100 may operate in accordance with an Institute of Electrical and Electronics Engineers (IEEE) standard such as the IEEE 802.16p standard, or any future version or implementation thereof, although the scope of the claimed subject matter is not limited in this respect.

In one or more embodiments, in a connected mode, an M2M device such as M2M mobile station 114 may perform a handover from one base station to another base station referred to as a target base station. Depending on which M2M zone or zones that the target base station is serving, the M2M mobile station 114 may or may not be required to update its M2M group and therefore may need to update its MGID. It should be noted that an M2M group is valid only within a particular M2M zone. Therefore, in general, if an M2M device is handed over from a base station to a target base station wherein both base stations serve the same M2M zone, then there is no need to change the MGID. However, if an M2M device is handed over from a base station to a target base station wherein the target base station servers a different M2M zone and does not serve the original M2M zone, then the M2M device needs to update its M2M group and therefore its MGID. Example scenarios for such handovers are shown in and described with respect to FIG. 2 through FIG. 5, below.

Figure 2:
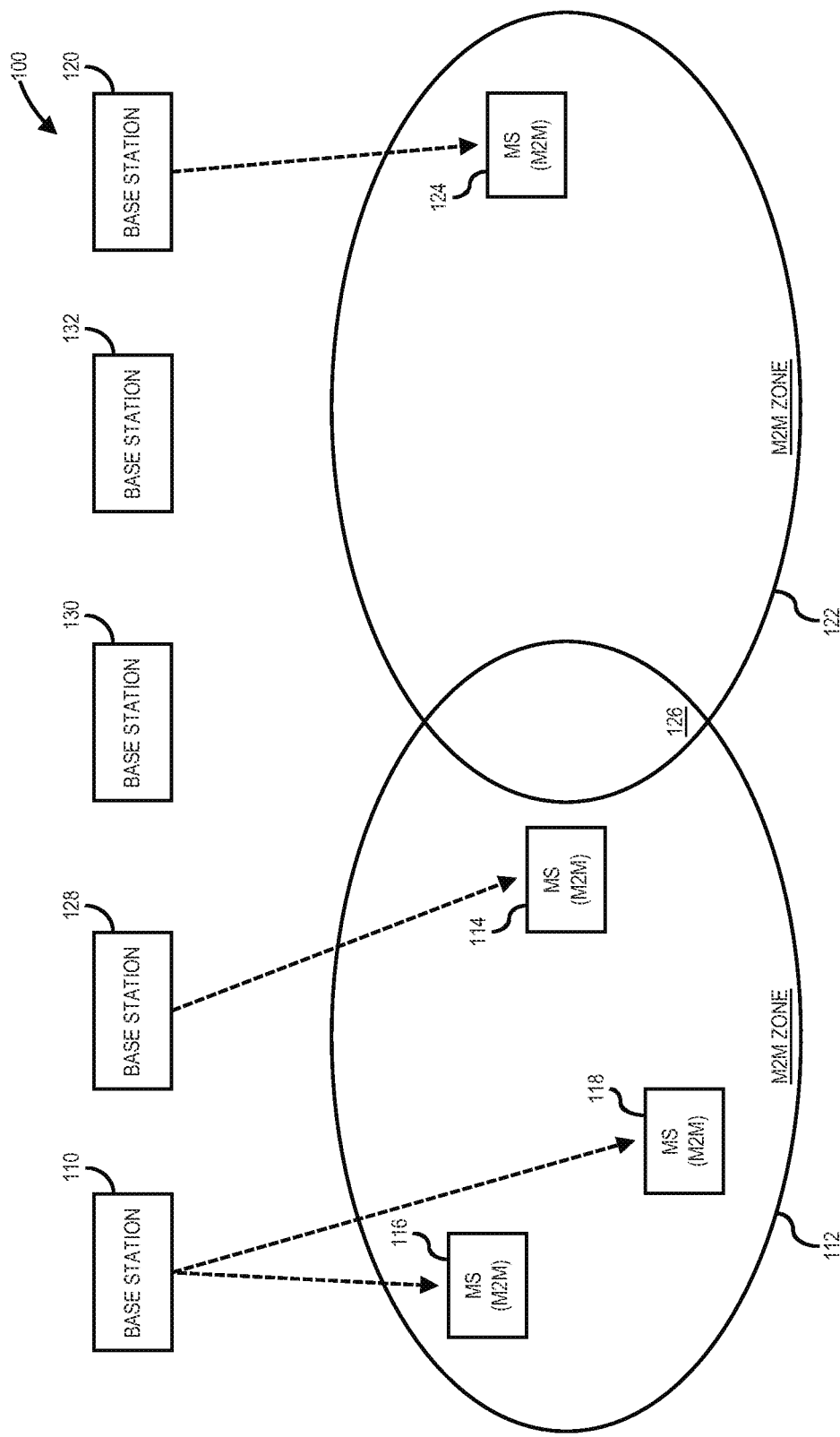
FIG. 2 is a diagram of the a machine-to-machine (M2M) system of FIG. 1 in which the M2M mobile station has undergone a handover to a target base station in the first M2M zone in accordance with one or more embodiments.

Referring now to FIG. 2 is a diagram of the a machine-to-machine (M2M) system of FIG. 1 in which the M2M mobile station has undergone a handover to a target base station in the first M2M zone in accordance with one or more embodiments will be discussed. Sometimes an M2M mobile station may perform a handover from one base station to another base station wherein the target base station is still located within the same zone as the first base station. As shown in FIG. 2, the M2M mobile station 114 has performed a handover from base station 110 to target base station 128. Base station 128 transmits its M2M zone identifier as an M2M_ZONE_ID in a message that is received by the M2M mobile station 114. The M2M mobile station 114 then compares the M2M zone information broadcast by the target base station 128 to its previous M2M zone information. Since the target base station 128 is located within the same M2M zone, M2M zone 112, the M2M zone information transmitted by the target base station 128 is the same as the M2M zone information of the original base station 110. As a result, since the M2M_ZONE_ID is the same because the zone has not changed, the M2M group does not change, and there is no need for M2M mobile station 114 to update its MGID.

Figure 3:
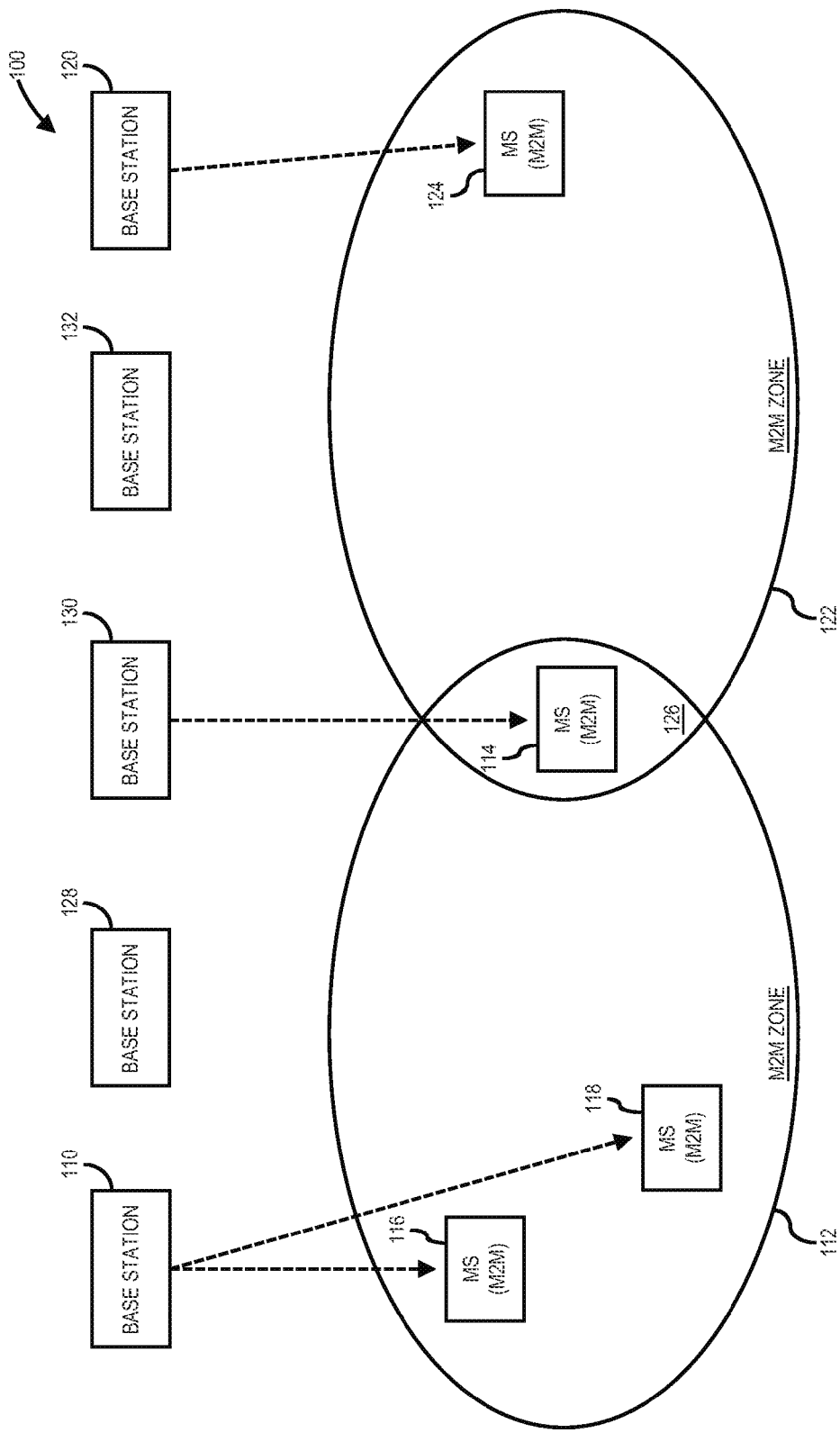
FIG. 3 is a diagram of a machine-to-machine (M2M) system of FIG. 1 in which the M2M mobile station has undergone a handover to a target base station in an overlap region between the first M2M zone and a second M2M zone in accordance with one or more embodiments.

Referring now to FIG. 3, a diagram of a machine-to-machine (M2M) system of FIG. 1 in which the M2M mobile station has undergone a handover to a target base station in an overlap region between the first M2M zone and a second M2M zone in accordance with one or more embodiments will be discussed. One or more of the devices of a first group may move/relocate from one M2M zone to another M2M zone, for example M2M mobile station 114 of first M2M group may move from M2M zone 112 to M2M zone 122. Such an event occurs, when the M2M mobile station 114 may be handed over from its serving base station 110 to a target base station 130, and the target base station 130 is located in both the first M2M zone 112 and the second M2M zone 122 as shown in FIG. 3. Therefore, the target base station 130 is located in the overlap region of the first M2M zone 112 and the second M2M zone 122. When the M2M mobile station 114 performs such a handover from its serving base station 110 to the target base station 130, the M2M mobile station 114 may listen to the M2M zone information broadcast from the target base station 130 to learn if the target base station 130 resides in the coverage area of the first M2M zone 112 or not. In one or more embodiments, the first M2M zone 112 and the second M2M zone 122 may at least partially overlap at an overlap region 126 and the target base station 130 is located in this overlap region 126. In this case, the target base station 130 may broadcast the M2M_ZONE_ID of the first M2M zone and the M2M_ZONE_ID of the second M2M zone. Therefore, when the an M2M mobile station 114 moves to the coverage area of the target base station 130 and receives this broadcast message, it will determine that the target base station 130 belongs to its current first M2M zone. Thus, in such a situation, an M2M mobile station 114 may not need to change its MGID when it performs a handover from one base station 110 to another base station 130 wherein the base station 130 is still in the first M2M zone 112, for example where the M2M mobile station 114 moves to the overlap region 126. It should be noted that base station 130 in the overlap region 126 may in fact serve multiple M2M zones such as both the first M2M zone 112 and the second M2M zone 122. In such a situation, the base station 130 serving multiple M2M zones will broadcast M2M zone information for all of the M2M zones that it serves. Thus, base station 130 broadcasts the M2M_ZONE_ID for both the first M2M zone 112 and the second M2M zone 122, which is received by the M2M mobile station 114 when it performs a handover to the target base station 130 in the overlap region. Since the M2M mobile station 114 receives the M2M zone information for its original M2M zone, first M2M zone 112, the M2M mobile station 114 is still in the same M2M zone so it does not need to update its M2M group and therefore does not need to update its MGID. Only if the M2M mobile station 114 has completely exited its original zone when it performs a handover to a new base station does the M2M mobile station 114 need to update its MGID.

Figure 4:
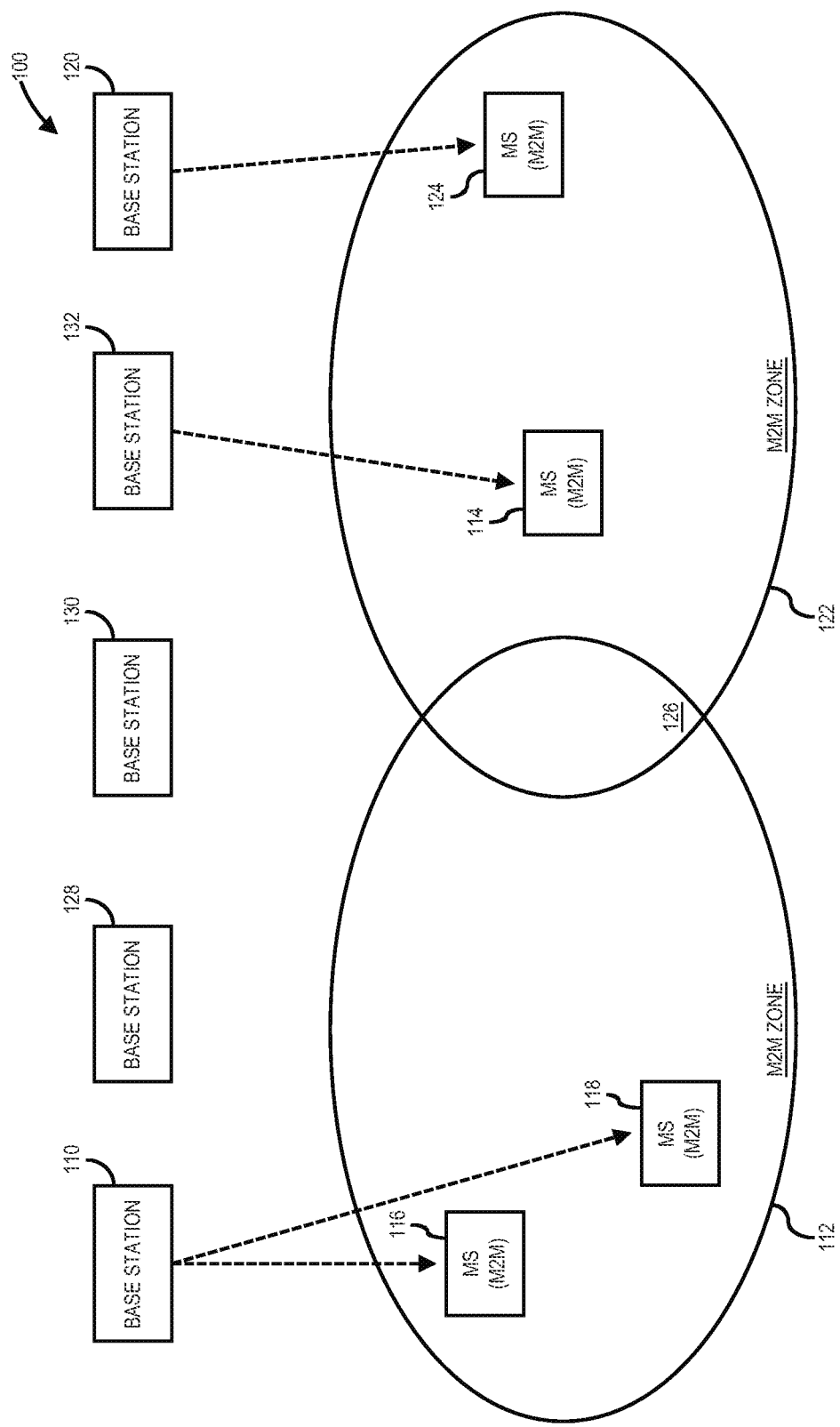
FIG. 4 is a diagram of the machine-to-machine (M2M) system of FIG. 1 in which the M2M mobile station has undergone a handover to a target base station that is located in a second M2M zone but not in the first M2M zone in accordance with one or more embodiments.

Referring now to FIG. 4, a diagram of the machine-to-machine (M2M) system of FIG. 1 in which the M2M mobile station has undergone a handover to a target base station that is located in a second M2M zone but not in the first M2M zone in accordance with one or more embodiments will be discussed. As shown in FIG. 4, the M2M mobile station 114 has moved from being served by base station 110 in a first M2M group in a first M2M zone 112 to being served by a new target base station 132 in second M2M zone 122. The M2M mobile station 114 listens to the M2M zone information broadcast by the target base station 132, for example the message carrying the M2M_ZONE_ID. The M2M mobile station 114 identifies that the M2M zone information broadcast by the target base station 132 indicates that the M2M mobile station 114 is now in a new M2M zone, second M2M zone 122, and has completely exited the previous M2M zone, first M2M zone 112. As a result, since the M2M zone has changed, the M2M mobile station 114 will request to update or change its M2M group in the M2M system, and communicate with the target base station 132 to update its MGID to a MGID valid in the second M2M zone 122. To reduce or minimize the overhead, in one or more embodiments, the M2M system 100 may periodically broadcast a sufficient amount of information such as the M2M zone ID (M2M_ZONE_ID) to specify the geographic boundaries between multiple M2M zones. The M2M mobile station 114 receives such broadcast information from either the serving base station 110 and/or the target base station 120 to determine if it needs to update its MGID and/or update its M2M zone. Once the M2M mobile station 114 has updated its MGID, the M2M mobile station 114 may operate within the second M2M zone 122 using its MGID which is valid within the second M2M zone 122.

Thus, in one or more embodiments, when M2M mobile station 114 performs a handover from its serving base station to a target base station, the M2M mobile station 114 listens to the M2M_ZONE_ID information from the target base station which then becomes the new serving base station for the M2M mobile station 114 after the handover is performed. If M2M_ZONE_ID information from the target base station indicates to the M2M mobile station 114 that it is now in a new M2M zone, for example second M2M group 122, the M2M mobile station 114 may request from the M2M system 100 a new MGID that corresponds to the new M2M group.

In situations where the M2M mobile station 114 is in an idle mode, the M2M mobile device 114 may periodically wake up during a paging listening interval to receive the broadcast message carrying information about the M2M zone to determine if the M2M mobile device 114 needs to update its M2M Group and/or its MGID. In idle mode, the M2M mobile station 114 may learn about the M2M Group boundary for its M2M group, such as M2M group 112, by monitoring the M2M_ZONE_ID broadcast from the serving base station, and/or by contacting the network to learn about the M2M Group boundary for that particular base station based at least in part on the base station identifier (BSID) for that base station. During an idle state the MGID of the M2M mobile station 114 may be changed or updated via a location update procedure, for example via an M2M device initiated location update or a base station initiated location update, or by network reentry. The location update may be based on a paging message from the base station or be based on a timer based update. For example, the M2M device may wake during a paging listening interval to determine if its current base station is or is not part of the original or previous M2M zone. If not, then the M2M device will update its MGID and also its M2M_ZONE_ID. Further discussion of how an M2M mobile station 114 may determine if an when it needs to change is M2M Group and/or MGID appear with respect to FIG. 7 and FIG. 8, below. An example of an M2M system 100 wherein there is no overlap region between M2M zones is shown in and described with respect to FIG. 5, below.

Figure 5:
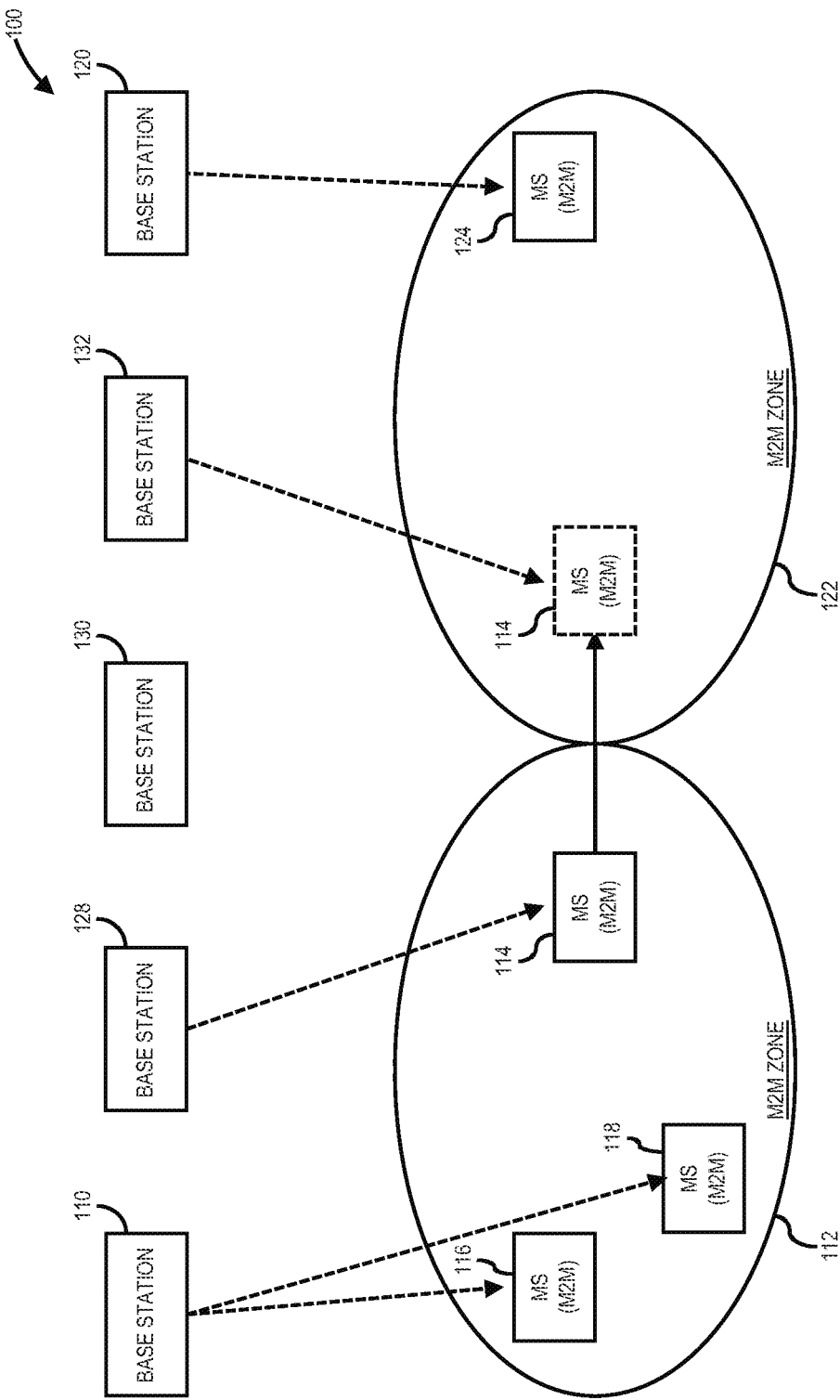
FIG. 5 is a diagram of a machine-to-machine (M2M) system in which an M2M mobile station served by a base station in a first M2M zone has undergone a handover to a target base station in a second M2M zone wherein the M2M zones do not overlap in accordance with one or more embodiments.

Referring now to FIG. 5, a diagram of a machine-to-machine (M2M) system in which an M2M mobile station served by a base station in a first M2M zone has undergone a handover to a target base station in a second M2M zone wherein the M2M zones do not overlap in accordance with one or more embodiments. It should be noted that the M2M system 100 of FIG. 5 is substantially similar to the M2M system 100 of FIG. 1 except that there is no overlapping region 126 between the zones of the M2M groups 112 and 122 in the embodiments shown in FIG. 3 and FIG. 4. In such embodiments, there is a distinct boundary between the M2M zones such that when an M2M mobile station 114 performs a handover from a serving base station 128 to a target base station 132, the M2M mobile station 114 needs to switch its M2M Group and/or MGID to that of the second M2M group 122 served by the target base station 132 since there is no overlap between the M2M zones served by the respective base stations. In any event, the M2M mobile station 114 listens to messages broadcast by the base stations to determine if the M2M mobile station 114 has changed M2M zones and as a result needs to update its M2M Group and/or its MGID as determined by the M2M system 100. An example architecture of an M2M system is shown in and described with respect to FIG. 6, below.

Figure 6:
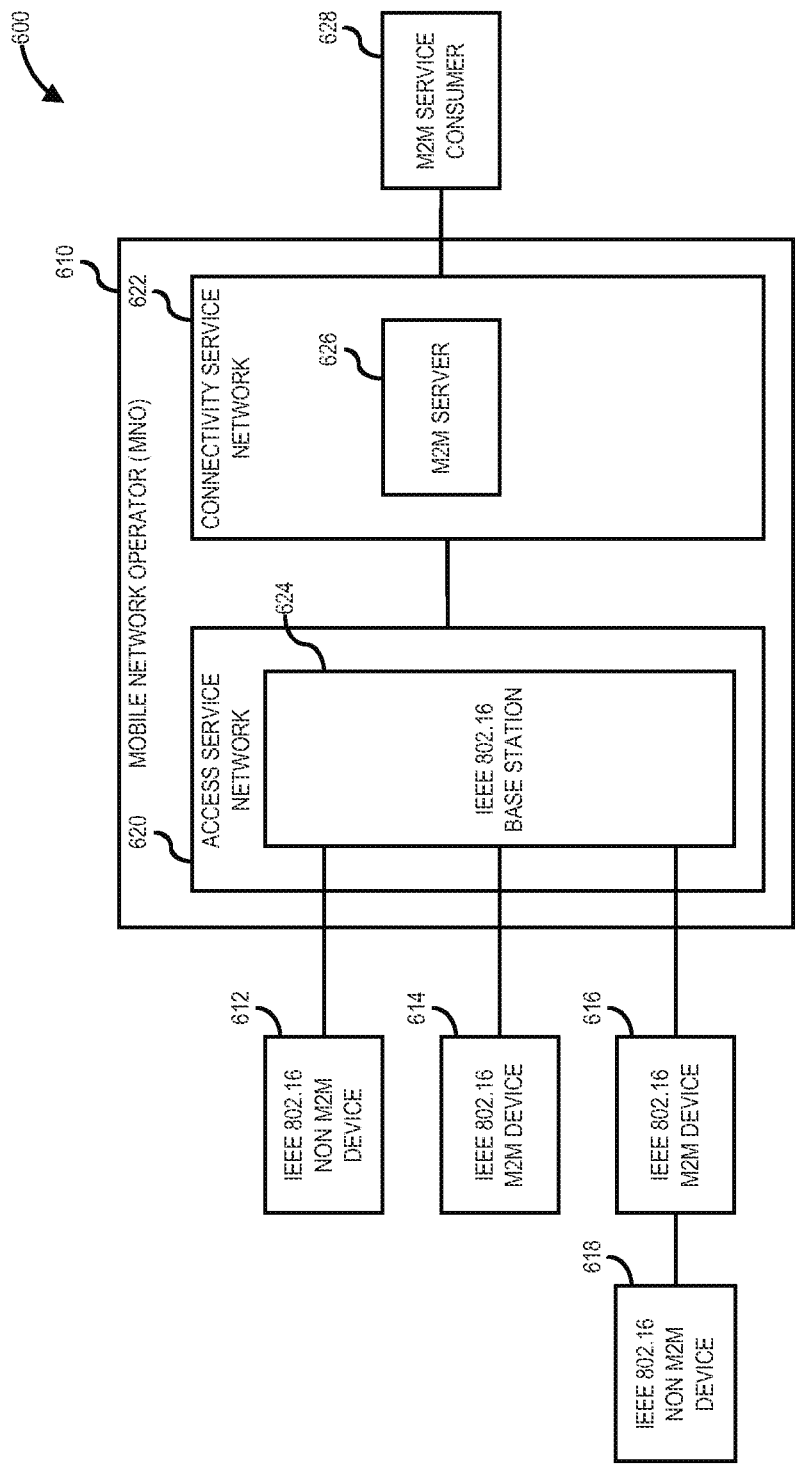
FIG. 6 is a diagram of an example architecture of a machine-to-machine (M2M) system as shown in FIG. 1 through FIG. 5 above illustrating the mobile network operator and the service consumer in accordance with one or more embodiments.

Referring now to FIG. 6 is a diagram of an example architecture of a machine-to-machine (M2M) system as shown in FIG. 1 through FIG. 5 above illustrating the mobile network operator and the service consumer in accordance with one or more embodiments will be discussed. As shown in FIG. 6, the architecture 600 shown in FIG. 6 may be for an M2M system 100 as shown in FIG. 1 through FIG. 5, wherein architecture 600 includes a mobile network operator (MNO) 610 to manage one or more M2M devices such as M2M device 614 and/or M2M device 616, and/or one or more non M2M devices such as non M2M device 612 and/or non M2M device 618. In any event, the architecture 600 may be implemented in an Institute of Electrical and Electronics Engineers (IEEE) compliant network such as an IEEE 802.16 network such as an IEEE 802.16p network based on IEEE 802.16e network to implement a Worldwide Interoperability for Microwave Access (WiMAX) system, or an IEEE 802.16p network based on IEEE 802.16m network to implement a WiMAX-II system, although the scope of the claimed subject matter is not limited in this respect. In such embodiments, the non M2M devices may be capable of operating according to an IEEE 802.16 standard, and the M2M devices also may be capable of operating according to an IEEE 802.16 standard, in particular an IEEE 802.16p standard, although the scope of the claimed subject matter is not limited in this respect. Alternatively, architecture 600 may be in compliance with a Third Generation Partnership Project (3GPP) standard such as a 3G system, or may be in compliance with a Long Term Evolution (LIE) or an LIE-Advanced system such as a 4G system, although the scope of the claimed subject matter is not limited in this respect.

In some embodiments, both M2M devices and non M2M devices may be capable of directly communicating with mobile network operator 610, and in some embodiments, a non M2M device 618 may be capable of indirectly communicating with mobile network operator 610 via an M2M device 616 in order for such a non M2M device 618 to provide M2M services. The devices may communicate via a wireless air interface via an IEEE 802.16 compliant base station 624 as part of an IEEE 802.16 Access Service Network (ASN) 520. The Access Service Network 620 may be coupled to a Connectivity Service Network (CSN) 622 which may include one or more M2M servers 626. The M2M server 626 may then couple with an M2M service consumer 628, which may be coupled to mobile network operator 610 via a network such as the Internet, in order for M2M service consumer 628 to receive M2M services from the M2M devices and/or non M2M devices via the mobile network operator 610. It should be noted that the architecture 600 an M2M network as shown in FIG. 5 is merely one example network architecture wherein other types of network architectures may be provided to implement an M2M system 100, and the scope of the claimed subject matter is not limited in this respect. An example flow diagram of a method for an M2M mobile station operating in an M2M system 100 to change its M2M group while in a connected mode is shown in and described with respect to FIG. 7, below.

Figure 7:
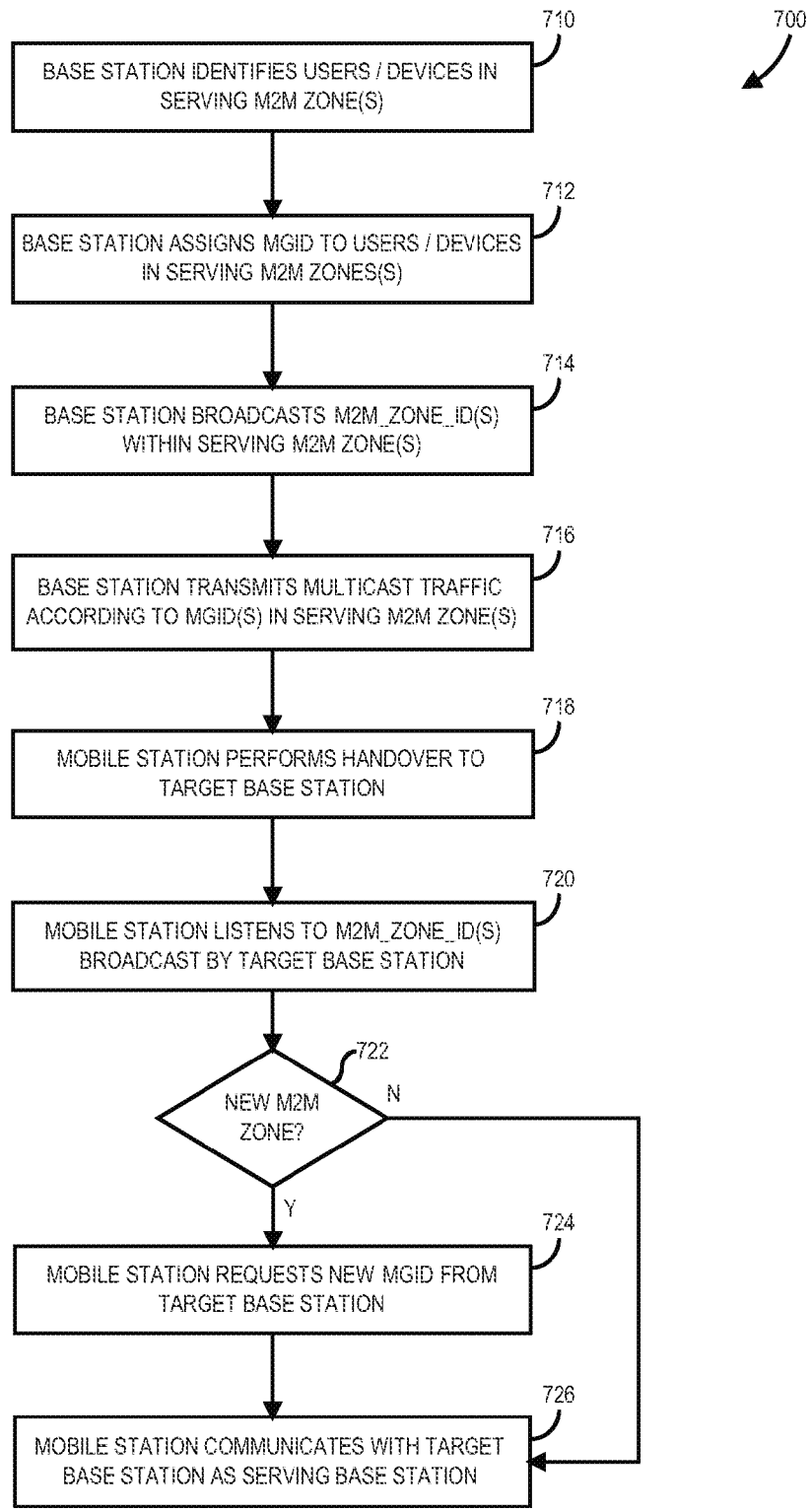
FIG. 7 is a flow diagram of a method for a machine-to-machine (M2M) mobile station to change M2M groups while in a connected mode in accordance with one or more embodiments.

Referring now to FIG. 7 is a flow diagram of a method for a machine-to-machine (M2M) mobile station to change M2M groups while in a connected mode in accordance with one or more embodiments will be discussed. Method 700 illustrates one particular embodiment of a method for a machine-to-machine (M2M) mobile station to change M2M groups in an M2M system. However, in one or more alternative embodiments, various other orders of the blocks of method 700 may be implemented, with more or fewer blocks, and the scope of the claimed subject matter is not limited in this respect. At block 710 a base station identifies one or more M2M users or M2M devices that are located in one or more of its M2M zones that the base station is serving. The base station then assigns at block 712 an M2M Group Identifier (MGID) to the users or devices in a respective M2M zone. At block 714, the base station periodically broadcasts the M2M_ZONE_ID for a given M2M zone so that the users or devices within a given M2M zone may receive multicast traffic that is transmitted by the base station at block 716 to all the users in a given M2M group according to the MGID of those users or devices, and so that the M2M users or devices may transmit their traffic to the base station according to the resources assigned to their M2M group. Then, as shown in and described with respect to FIG. 1 through FIG. 5, above, a mobile station such as M2M mobile station 114 may perform a handover at block 718 from the current serving base station to a target base station. The M2M mobile station 114 then listens at block 720 to the M2M_ZONE_ID broadcast by the target base station to determine at block 722 if the M2M mobile station 114 is in a new M2M zone and needs a new MGID. If the M2M mobile station 114 is not in a new M2M zone and therefore does not need a new MGID, the M2M mobile station 114 may execute block 626 to communicate with the target base station as its new serving base station without changing the MGID of the M2M mobile station 114. Otherwise, if the M2M mobile station 114 is in a new M2M zone and therefore needs a new MGID, the M2M mobile station 114 requests a new MGID from the target base station at block 724, and then may proceed to communicate with the target base station as its new serving base station at block 726 using its new MGID. An example flow diagram of a method for an M2M mobile station operating in an M2M system 100 to change its M2M group while in an idle mode is shown in and described with respect to FIG. 8, below.

Figure 8:
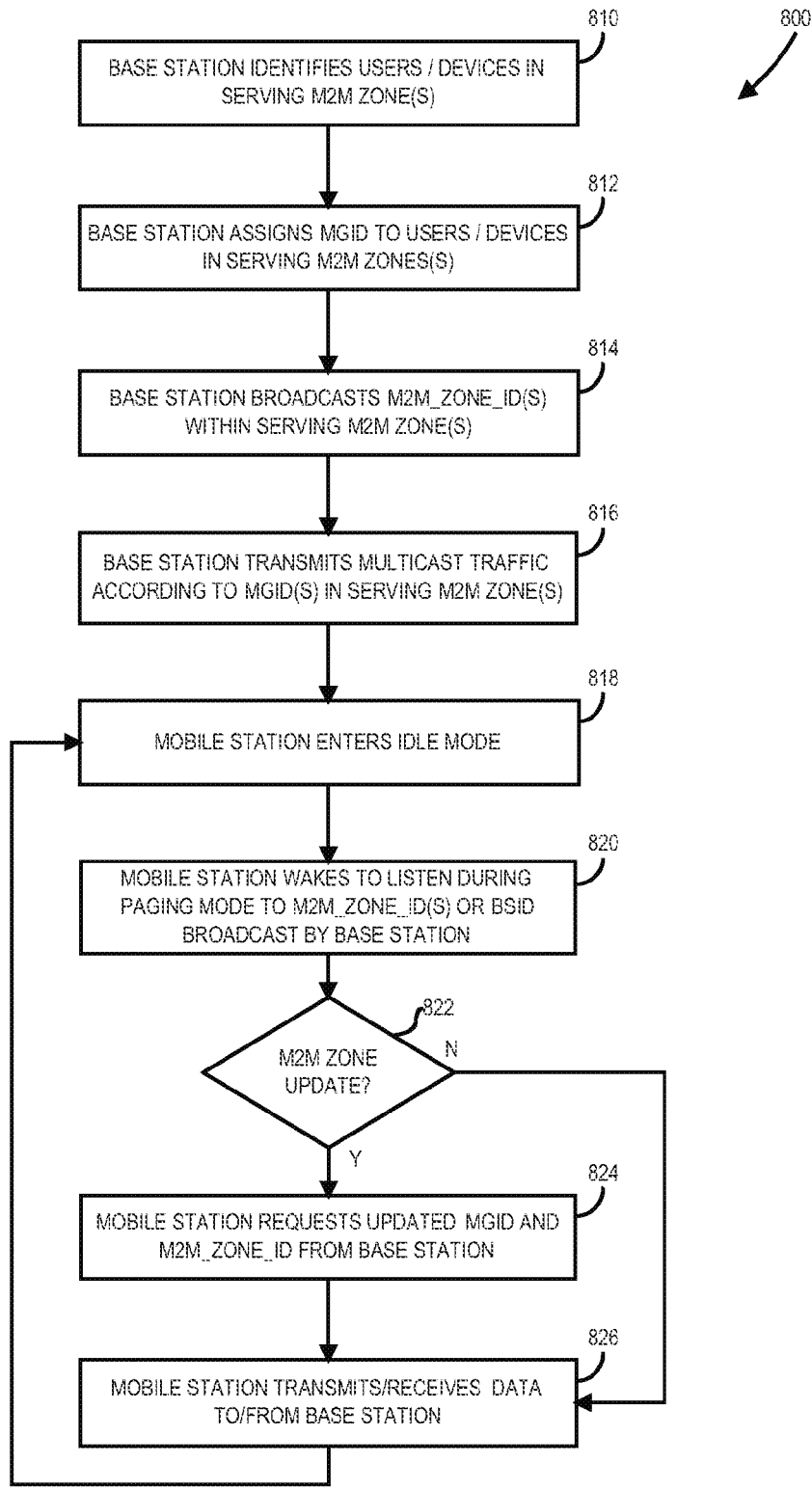
FIG. 8 is a flow diagram of a method for a machine-to-machine (M2M) mobile station to change M2M groups while in an idle mode in accordance with one or more embodiments.

Referring now to FIG. 8, a flow diagram of a method for a machine-to-machine (M2M) mobile station to change M2M groups while in an idle mode in accordance with one or more embodiments will be discussed. Method 800 illustrates one particular embodiment of a method for a machine-to-machine (M2M) mobile station to change M2M groups while in an idle mode in an M2M system. However, in one or more alternative embodiments, various other orders of the blocks of method 800 may be implemented, with more or fewer blocks, and the scope of the claimed subject matter is not limited in this respect. At block 810 a base station identifies one or more M2M users or M2M devices that are located in one or more of its M2M zones that the base station is serving. The base station then assigns at block 812 an M2M Group Identifier (MGID) to the users or devices in a respective M2M zone. At block 814, the base station periodically broadcasts the M2M_ZONE_ID for a given M2M zone and its base station identifier (BSID) so that the users or devices within a given M2M zone may receive multicast traffic that is transmitted by the base station at block 816 to all the users in a given M2M group according to the MGID of those users or devices, and so that the M2M users or devices may transmit their traffic to the base station according to the resources assigned to their M2M group. Then, as shown in and described with respect to FIG. 1 through FIG. 5, above, a mobile station such as M2M mobile station 114 may enter into an idle mode at block 818. The M2M mobile station 114 then periodically wakes at block 820 during its paging listening interval to listen to the M2M_ZONE_ID and the BSID broadcast by its serving base station so that the M2M mobile station 114 may determine at block 822 if the M2M mobile station 114 needs to update its MGID if the BSID and the M2M_ZONE_ID has changed. The paging may be initiated by the base station to broadcast a paging message (AAI_PAG_ADV) to the M2M mobile station 114, or the M2M mobile station 114 may periodically wake up during a paging listening interval. If the M2M mobile station 114 does not need to update its MGID, then the M2M mobile station may connect with its base station and transmit or receive data to or from the base station using its current MGID. Otherwise, if the M2M mobile station 114 needs to update its MGID as determined at block 822, the M2M mobile station 114 requests at block 824 for an updated MGID from its serving base station. The determination may made at least in part on the identity of the current base station, the base station identifier (BSID), and/or on the current geographical location based at least in part on the current M2M_ZONE_ID. The M2M mobile station 114 may then transmit or receive its data to or from the base station at block 826 using its updated MGID. An example block diagram of an information handling system capable of identifying and implement a change to its MGID is shown in and described with respect to FIG. 9, below.

Figure 9:
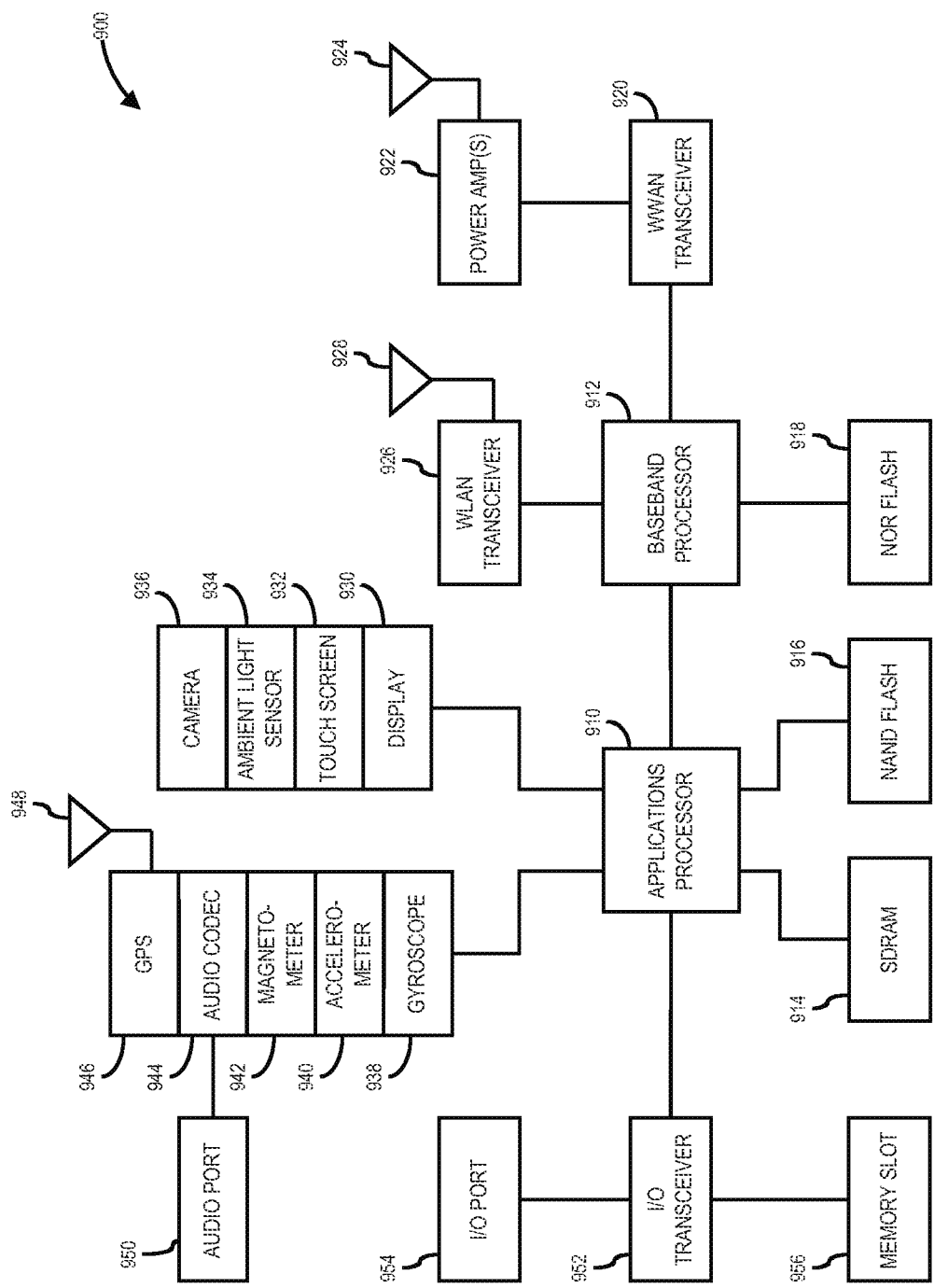
FIG. 9 is a block diagram of an information handling system capable of identifying and implementing a change to the machine-to-machine (M2M) group of an M2M device in a broadband network in accordance with one or more embodiments.

Referring now FIG. 9, a block diagram of an information handling system capable of identifying and implementing a change to the machine-to-machine (M2M) group of an M2M device in a broadband network in accordance with one or more embodiments will be discussed. Information handling system 900 of FIG. 9 may tangibly embody one or more of any of the network elements or devices of the M2M system 100 as shown in and described with respect to FIG. 1 through FIG. 5. For example, information handling system 900 may represent the hardware of infrastructure M2M mobile station 114, serving base station 110, target base station 120, and/or any of the devices in the M2M groups and/or other base stations, with greater or fewer components depending on the hardware specifications of the particular device or network element. Although information handling system 900 represents one example of several types of computing platforms, information handling system 900 may include more or fewer elements and/or different arrangements of elements than shown in FIG. 9, and the scope of the claimed subject matter is not limited in these respects.

In one or more embodiments, information handling system 900 may include an applications processor 810 and a baseband processor 912. Applications processor 910 may be utilized as a general purpose processor to run applications and the various subsystems for information handling system 900. Applications processor 910 may include a single core or alternatively may include multiple processing cores wherein one or more of the cores may comprise a digital signal processor or digital signal processing core. Furthermore, applications processor 910 may include a graphics processor or coprocessor disposed on the same chip, or alternatively a graphics processor coupled to applications processor 910 may comprise a separate, discrete graphics chip. Applications processor 910 may include on board memory such as cache memory, and further may be coupled to external memory devices such as synchronous dynamic random access memory (SDRAM) 914 for storing and/or executing applications during operation, and NAND flash 916 for storing applications and/or data even when information handling system 900 is powered off. Baseband processor 912 may control the broadband radio functions for information handling system 900. Baseband processor 912 may store code for controlling such broadband radio functions in a NOR flash 918. Baseband processor 912 controls a wireless wide area network (WWAN) transceiver 920 which is used for modulating and/or demodulating broadband network signals, for example for communicating via a WiMAX network based on IEEE 802.16p or 3GPP LIE network or the like. The WWAN transceiver 920 couples to one or more power amps 922 respectively coupled to one or more antennas 924 for sending and receiving radio-frequency signals via the WWAN broadband network. The baseband processor 912 also may control a wireless local area network (WLAN) transceiver 896 coupled to one or more suitable antennas 928 and which may be capable of communicating via a Wi-Fi, Bluetooth, and/or an amplitude modulation (AM) or frequency modulation (FM) radio standard including an IEEE 802.11 a/b/g/n standard or the like. It should be noted that these are merely example implementations for applications processor 910 and baseband processor 912, and the scope of the claimed subject matter is not limited in these respects. For example, any one or more of SDRAM 914, NAND flash 916 and/or NOR flash 918 may comprise other types of memory technology such as magnetic memory, chalcogenide memory, phase change memory, or ovonic memory, and the scope of the claimed subject matter is not limited in this respect.

In one or more embodiments, applications processor 910 may drive a display 930 for displaying various information or data, and may further receive touch input from a user via a touch screen 932 for example via a finger or a stylus. An ambient light sensor 934 may be utilized to detect an amount of ambient light in which information handling system 900 is operating, for example to control a brightness or contrast value for display 930 as a function of the intensity of ambient light detected by ambient light sensor 934. One or more cameras 936 may be utilized to capture images that are processed by applications processor 910 and/or at least temporarily stored in NAND flash 916. Furthermore, applications processor may couple to a gyroscope 938, accelerometer 940, magnetometer 942, audio coder/decoder (CODEC) 944, and/or global positioning system (GPS) controller 946 coupled to an appropriate GPS antenna 948, for detection of various environmental properties including location, movement, and/or orientation of information handling system 900. Alternatively, controller 946 may comprise a Global Navigation Satellite System (GNSS) controller. Audio CODEC 944 may be coupled to one or more audio ports 950 to provide microphone input and speaker outputs either via internal devices and/or via external devices coupled to information handling system via the audio ports 950, for example via a headphone and microphone jack. In addition, applications processor 910 may couple to one or more input/output (I/O) transceivers 952 to couple to one or more I/O ports 954 such as a universal serial bus (USB) port, a high-definition multimedia interface (HDMI) port, a serial port, and so on. Furthermore, one or more of the I/O transceivers 952 may couple to one or more memory slots 956 for optional removable memory such as secure digital (SD) card or a subscriber identity module (SIM) card, although the scope of the claimed subject matter is not limited in these respects.

Figure 10:
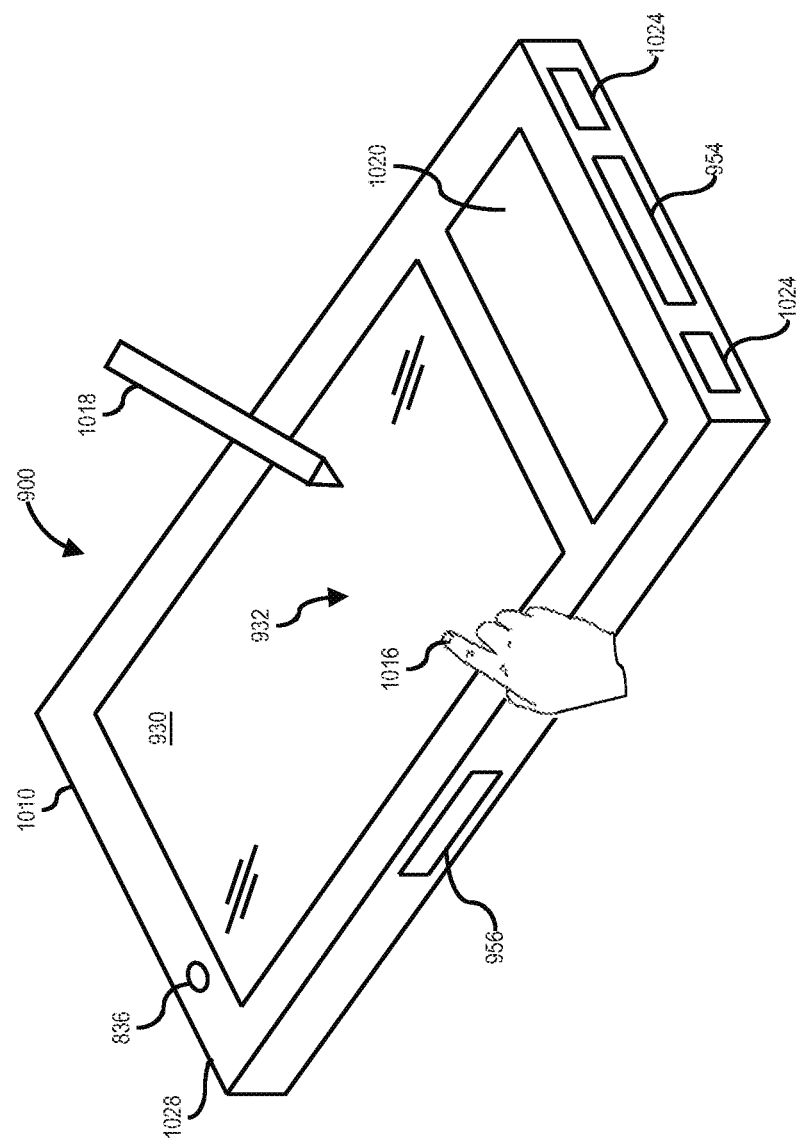
FIG. 10 is an isometric view of an information handling system of FIG. 10 that optionally may include a touch screen in accordance with one or more embodiments.

Referring now to FIG. 10, an isometric view of an information handling system of FIG. 9 that optionally may include a touch screen in accordance with one or more embodiments will be discussed. FIG. 10 shows an example implementation of information handling system 900 of FIG. 9 tangibly embodied as a cellular telephone, smartphone, or tablet type device or the like. In one or more embodiments, the information handling system 900 may comprise any one of the infrastructure nodes and/or the mobile stations of FIG. 1 through FIG. 5, although the scope of the claimed subject matter is not limited in this respect. The information handling system 900 may comprise a housing 1010 having a display 930 which may include a touch screen 932 for receiving tactile input control and commands via a finger 1016 of a user and/or a via stylus 1018 to control one or more applications processors 910. The housing 1010 may house one or more components of information handling system 900, for example one or more applications processors 910, one or more of SDRAM 914, NAND flash 916, NOR flash 918, baseband processor 912, and/or WWAN transceiver 920. The information handling system 900 further may optionally include a physical actuator area 1020 which may comprise a keyboard or buttons for controlling information handling system via one or more buttons or switches. The information handling system 900 may also include a memory port or slot 956 for receiving non-volatile memory such as flash memory, for example in the form of a secure digital (SD) card or a subscriber identity module (SIM) card. Optionally, the information handling system 900 may further include one or more speakers and/or microphones 1024 and a connection port 954 for connecting the information handling system 900 to another electronic device, dock, display, battery charger, and so on. In addition, information handling system 900 may include a headphone or speaker jack 1028 and one or more cameras 936 on one or more sides of the housing 1010. It should be noted that the information handling system 900 of FIG. 10 may include more or fewer elements than shown, in various arrangements, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to changing the machine-to-machine (M2M) group of an M2M device and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof and/or further without providing substantial change thereto. It is the intention of the claims to encompass and/or include such changes.

What is claimed is:

1. An article of manufacture comprising a storage medium having instructions stored thereon that, if executed, result in:

communicating with a first base station using a first group identifier comprising a first machine-to-machine group identifier (MGID) assigned to machine-to-machine (M2M) devices in a first M2M zone;
performing a handover to a second base station;
listening to a message broadcast by the second base station to determine if the first MGID should be changed; and
if the group identifier should be changed, requesting assignment of a second group identifier comprising a second a machine-to-machine group identifier (MGID) assigned to M2M devices in a second M2M zone for communication with the second base station;
wherein the message broadcast by the by the second base station indicates the geographic boundaries between the first M2M zone and the second M2M zone.

2. An article of manufacture as claimed in claim 1, wherein the first M2M zone at least partially overlaps with the second M2M zone.

3. An article of manufacture as claimed in claim 1, wherein the first M2M zone does not overlap with the second M2M zone.

4. An article of manufacture as claimed in claim 1, wherein the message broadcast by the second base station comprises a machine-to-machine (M2M) zone identifier (M2M_ZONE_ID), wherein the instructions if executed further result in executing said requesting assignment of a second group identifier in response to a change of the M2M zone identifier.

5. An article of manufacture comprising a storage medium having instructions stored thereon that, if executed, result in:
waking from an idle mode to listen to a message broadcast by a base station; and
if the message indicates that a group identifier should be changed, requesting assignment of an updated group identifier from the base station;
wherein the message broadcast by the base station includes information about a machine-to-machine (M2M) zone identifier (M2M_ZONE_ID), wherein the instructions if executed, further comprising executing said requesting assignment of an updated group identifier if the M2M zone identifier has changed.

6. An article of manufacture as claimed in claim 5, wherein the message broadcasted by the base station comprises a base station identifier (BSID), wherein the instructions if executed further result in executing said requesting assignment of an updated group identifier in response to a change in the BSID if the machine-to-machine (M2M) zone identifier has changed.

7. An information handling system, comprising:
a baseband processor coupled to one or more wireless transceivers, wherein the baseband processor is configured to:
communicate with a first base station using a first group identifier comprising a first machine-to-machine group identifier (MGID) assigned to machine-to-machine (M2M) devices in a first M2M zone;
perform a handover to a second base station;
listen to a message broadcast by the second base station to determine if the first MGID should be changed; and
request assignment of a second group identifier comprising a second a machine-to-machine group identifier (MGID) assigned to M2M devices in a second M2M zone for communication with the second base station if the group identifier should be changed;
wherein the message broadcast by the by the second base station indicates the geographic boundaries between the first M2M zone and the second M2M zone.

8. An information handling system as claimed in claim 7, wherein the first M2M zone at least partially overlaps with the second M2M zone.

9. An information handling system as claimed in claim 7, wherein the first M2M zone does not overlap with the second M2M zone.

10. An information handling system as claimed in claim 7, wherein the message broadcasted by the second base station comprises a machine-to-machine (M2M) zone identifier (M2M_ZONE_ID), wherein the baseband processor is further configured to execute the request of assignment of a second group identifier in response to a change in the M2M zone identifier.

11. An information handling system as claimed in claim 7, further comprising an applications processor coupled to the baseband processor, and a touch screen to receive an input to control the applications processor.

12. An information handling system, comprising:
a baseband processor coupled to one or more wireless transceivers, wherein the baseband processor is configured to:
wake from an idle mode to listen to a message broadcast by a base station; and
request assignment of an updated group identifier from the base station if the message indicates that the group identifier should be changed;
wherein the message broadcast by the base station includes information about a machine-to-machine (M2M) zone identifier (M2M_ZONE_ID), wherein the baseband processor is further configured to execute the request assignment of an updated group identifier if the M2M zone identifier has been changed.

13. An information handling system as claimed in claim 12, wherein the group identifier comprises a machine-to-machine group identifier (MGID).

14. An information handling system as claimed in claim 12, wherein the message broadcast by the base station comprises a base station identifier (BSID), wherein the baseband processor is further configured to execute the request assignment of an updated group identifier in response to a change in the BSID if a machine-to-machine (M2M) zone identifier has been changed.

15. An information handling system as claimed in claim 12, further comprising an applications processor coupled to the baseband processor, and a touch screen to receive an input to control the applications processor.

* * * * *